(12) United States Patent
Paris et al.

(10) Patent No.: US 9,747,526 B2
(45) Date of Patent: *Aug. 29, 2017

(54) USING MACHINE LEARNING TO DEFINE USER CONTROLS FOR PHOTO ADJUSTMENTS

(71) Applicant: ADOBE SYSTEMS INCORPORATED, San Jose, CA (US)

(72) Inventors: Sylvain Paris, Jamaica Plain, MA (US); Mohit Gupta, Noida (IN); Srinivasa Madhava Phaneendra Angara, Noida (IN); Durga Ganesh Grandhi, Vizianagaram (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/876,223

(22) Filed: Oct. 6, 2015

(65) Prior Publication Data

US 2016/0026897 A1    Jan. 28, 2016

Related U.S. Application Data

(63) Continuation of application No. 14/034,194, filed on Sep. 23, 2013, now Pat. No. 9,195,909.

(51) Int. Cl.
*G06K 9/40* (2006.01)
*G06K 9/62* (2006.01)
(Continued)

(52) U.S. Cl.
CPC ........... *G06K 9/6253* (2013.01); *G06F 15/18* (2013.01); *G06T 5/50* (2013.01); *G06T 11/60* (2013.01);
(Continued)

(58) Field of Classification Search
CPC .......... G06K 9/6253; G06K 9/66; G06T 5/50; G06T 2207/20092; G06T 2207/10004; G06F 15/18
(Continued)

(56) References Cited

U.S. PATENT DOCUMENTS 8,103,094 B2   1/2012   Wilensky
8,214,766 B1   7/2012   Berger et al.
(Continued)

OTHER PUBLICATIONS

First Action Interview Office Action dated Oct. 15, 2015 in U.S. Appl. No. 14/047,735, 8 pages.
(Continued)

*Primary Examiner* — Sheela C Chawan
(74) *Attorney, Agent, or Firm* — Shook, Hardy & Bacon L.L.P.

(57) ABSTRACT

In various example embodiments, a system and method for using machine learning to define user controls for image adjustment is provided. In example embodiments, a new image to be adjusted is received. A weight is applied to reference images of a reference dataset based on a comparison of content of the new image to the reference image of the reference dataset. A plurality of basis styles is generated by applying weighted averages of adjustment parameters corresponding to the weighted reference images to the new image. Each of the plurality of basis styles comprises a version of the new image with an adjustment of at least one image control based on the weighted averages of the adjustment parameters of the reference dataset. The plurality of basis styles is provided to a user interface of a display device.

20 Claims, 6 Drawing Sheets

(51) Int. Cl.
*G06F 15/18* (2006.01)
*G06T 5/50* (2006.01)
*G06T 11/60* (2006.01)

(52) U.S. Cl.
CPC .............. *G06T 2207/10004* (2013.01); *G06T 2207/20092* (2013.01)

(58) Field of Classification Search
USPC ....... 382/155, 159, 162, 168, 171, 172, 181, 382/190, 199, 198, 210, 232, 237, 254, 382/255, 263, 264, 266, 272, 274, 275, 382/276
See application file for complete search history.

(56) References Cited

U.S. PATENT DOCUMENTS

| | | | | |
|---|---|---|---|---|
| 9,195,909 | B2* | 11/2015 | Paris | G06K 9/6253 |
| 9,361,666 | B2* | 6/2016 | Paris | G06T 5/00 |
| 2007/0177779 | A1* | 8/2007 | Dennison | G06K 9/42 |
| | | | | 382/128 |
| 2011/0113361 | A1 | 5/2011 | Bhatt et al. | |
| 2012/0054686 | A1 | 3/2012 | Joo et al. | |
| 2012/0106848 | A1 | 5/2012 | Greig et al. | |
| 2014/0071148 | A1 | 3/2014 | Webb et al. | |
| 2014/0355821 | A1 | 12/2014 | Solem et al. | |

OTHER PUBLICATIONS

Notice of Allowance dated Feb. 10, 2016 in U.S. Appl. No. 14/047,735, 8 pages.
Final Office Action dated Mar. 24, 2016 in U.S. Appl. No. 14/034,259, 16 pages.
Author Unknown, "PhotoImpact® XL User Guide", Ulead Systems, Inc., Aug. 2003, 294 pages.
First Action Interview Preinterview Communication dated Mar. 17, 2015 in U.S. Appl. No. 14/034,194, 5 pages.
First Action Interview Office Action dated May 28, 2015 in U.S. Appl. No. 14/034,194, 5 pages.
First Action Interview Preinterview Communication dated Jul. 16, 2015 in U.S. Appl. No. 14/034,259, 5 pages.
Evening, Martin. The Adobe Photoshop Lightroom 4 Book: The Complete Guide for Photographers. Adobe Press, 2012. (uploaded in two parts).
Notice of Allowance dated Jul. 17, 2015 in U.S. Appl. No. 14/034,194, 11 pages.
First Action Interview Preinterview Communication dated Sep. 10, 2015 in U.S. Appl. No. 14/047,735, 5 pages.
First Action Interview Office Action dated Sep. 22, 2015 in U.S. Appl. No. 14/034,259, 17 pages.
Non-Final Office Action dated Jan. 26, 2017 in U.S. Appl. No. 14/034,259, 20 pages.

* cited by examiner

USING MACHINE LEARNING TO DEFINE USER CONTROLS FOR PHOTO ADJUSTMENTS

CROSS REFERENCE TO RELATED APPLICATIONS

This application is a continuation of U.S. Pat. No. 9,195,909, filed Sep. 23, 2013 and having issued on Nov. 24, 2015, titled "Using Machine Learning to Define User Controls for Photo Adjustments,", the disclosure of which is incorporated by reference herein in its entirety.

FIELD

The present disclosure relates generally to image processing and, in a specific example embodiment, to using machine learning to define user controls for photo adjustments.

BACKGROUND

Conventionally, correction algorithms for image processing cannot be customized to an input image that is being processed. For example, current image-processing systems may allow the user to select an auto adjust indicator which may adjust the image to a particular preset adjustment. The preset adjustment is a generic adjustment that does not take content of the input image into consideration.

BRIEF DESCRIPTION OF THE DRAWINGS

The present invention is described in detail below with reference to the attached drawing figures, wherein.

Various ones of the appended drawings merely illustrate example embodiments of the present invention and cannot be considered as limiting its scope.

DETAILED DESCRIPTION

The description that follows includes systems, methods, techniques, instruction sequences, and computing machine program products that exemplify illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Example embodiments described herein provide systems and methods for using machine learning to define user controls for image adjustments. Accordingly, the content and characteristics of each new image presented to the system are analyzed in order to provide basis styles of a new image and a control mechanism that adjusts image controls, such as brightness, contrast, sharpness, or saturation. In example embodiments, the new image to be adjusted is received. The system determines image descriptors for the new image (referred to as "new image descriptors"). These new image descriptors are compared to image descriptors of reference images of a reference dataset to evaluate how relevant each reference image in the reference dataset is to the new image. A weight may be associated with each reference image in the reference dataset accordingly. A plurality of basis styles is generated by applying adjustment parameters corresponding to weighted averages of adjustment parameters in the reference dataset, where the weighted averages correspond to the weights associated with each reference image. Each of the plurality of basis styles comprises a version of the new image with an adjustment of at least one image control based on the weighted averages of at least one adjustment parameter in the reference dataset. The plurality of basis styles is provided to a user interface of a display device.

Figure 1:
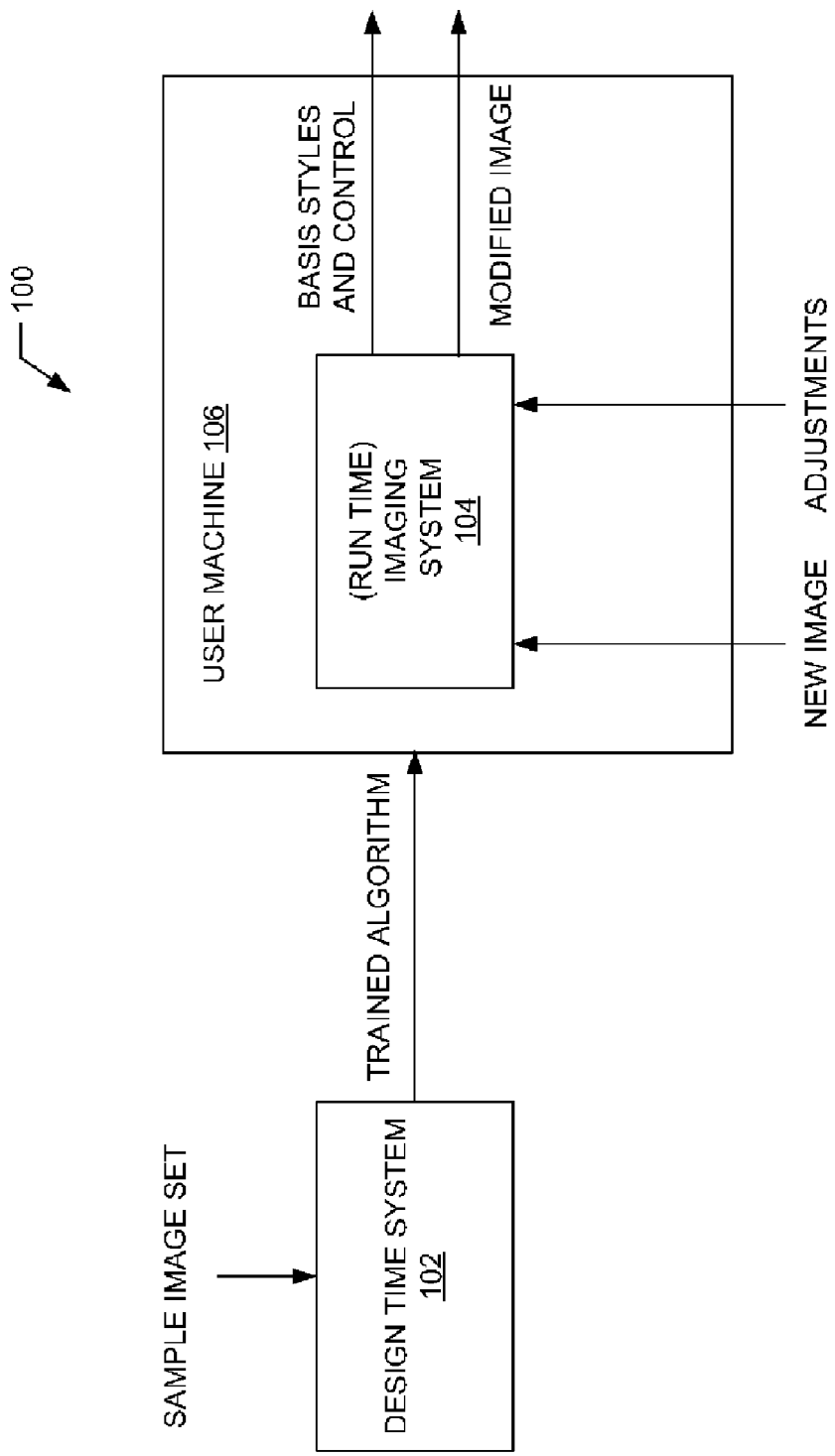
FIG. 1 is a block diagram illustrating an example embodiment of an environment in which example embodiments may be employed.

With reference to FIG. 1, an example environment 100 in which embodiments of the present invention may be utilized is shown. A design time system 102 generates a plurality of machine-learned data based on a sample image set. For example, the sample set may comprise a large number of sample images (e.g., 250 images) that are each adjusted by hand to provide "extreme" adjusted versions as well as a "good" version (e.g., from the perspective of a professional photographer) of the image. For instance, each image may be adjusted to provide versions having the lowest contrast, brightness, sharpness, or saturation as well as corresponding versions having the highest contrast, brightness, sharpness, or saturation. If the design time system 102 desires to train an algorithm for a two-dimensional adjustment (e.g., involving two different image controls), the samples may include extreme versions of these combinations of image controls. For example, each sample may be adjusted to provide a lowest brightness/lowest contrast version, a lowest brightness/highest contrast version, a highest brightness/lowest contrast version, and a highest brightness/highest contrast version. It is contemplated that the image controls may be combined in any combination and corresponding versions of "extreme" sample images based on the combinations of the combined image controls used to train the algorithm in the design time system 102.

Each of these different versions of each sample image is provided to the design time system 102 and used to "train" an image adjustment algorithm such that the image adjustment algorithm can later on, for example, automatically generate "extreme" and "good" versions of new images based on what it has learned from the sample set of images. In other embodiments, the image adjustment algorithm may be trained to automatically generate versions of the new images that are not at the "extremes" (e.g., at a lowest or highest image control value).

In the process of training the image adjustment algorithm, example embodiments determine image descriptors for each sample image. Image descriptors comprise a list of salient features of each sample image that are a summary of image features of each sample image. Examples of image features may include tonal information, color tone, number of faces, orientation of the image, or any other attributes that would assist in distinguishing one image from another image. These image descriptors are typically computed in the same manner. For instance, an element of an image descriptor is an average image brightness and another element of an image descriptor may be a number of faces detected in the image (e.g., using a face detection algorithm).

In some embodiments, the image adjustment algorithm "learns" or is trained to find parameters of a covariance function. The covariance function may take two image descriptors as input and return a number. If the number is low, it means that the two image descriptors correspond to unrelated images. However, if the number is high, the images are more related. Because this process is computationally expensive, the design time training may only occur once and the parameters of the covariance function do not change afterwards.

Once the design time system 102 completes training the algorithm, the trained algorithm and the machine-learned data may be stored to, accessed by, or associated with a (run time) imaging system 104 in a user machine 106. The learned data may comprise the set of sample images (also referred to as "reference dataset") along with data corresponding to the "extreme" versions and the "good" version of each sample image (also referred to as "reference image"). The "good" version of a sample image may be, for example, a version adjusted to what a professional photographer would consider ideal for the sample image. The data corresponding to the different versions includes adjustment parameters used to adjust the sample image to each of the different versions. In example embodiments, the trained algorithm may be transferred to the user machine 106 via a network (e.g., Internet, wide area network, or local area network) or using a tangible machine-readable storage device (e.g., CD-ROM).

In example embodiments, the imaging system 104 is configured to receive a new image from a user or operator of the user machine 106 and to apply the trained algorithm to the new image to provide basis styles of the new image to the user. Basis styles are versions of the new image using reference adjustments that are based on learned data (e.g., the adjustments made to the reference dataset). These basis styles are generated by the imaging system 104 based on content (e.g., new image descriptors) of the new image. Thus, two different new images will each result in different basis styles or reference points. The process for generating the basis styles will be discussed in more detail below. It is noted that the terms "basis style" and "reference point" may be used interchangeably.

In one embodiment, the basis styles comprise "extreme" versions of the new image that the user can view and, in some cases, select an adjustment from or in between. For example, the basis styles for a new image may be versions of the image with lowest brightness and lowest contrast, lowest brightness and highest contrast, highest brightness and lowest contrast, and highest brightness and highest contrast. Additionally, a control mechanism may be presented to the user along with the basis styles so that the user may select or adjust between the basis styles. The control mechanism may comprise, for example, one or more sliders or a multidirectional control knob. These adjustments may be received by the imaging system 104 and a modified version of the image generated and presented. The process for using machine learning to define user controls that include the basis styles for image adjustments will be discussed in further detail below.

The user machine 106 may comprise a mobile phone, laptop, tablet, or any other communication device (e.g., mobile device) that a user may utilize to view and adjust images such as photographs. While only one user machine 106 is shown in FIG. 1, it is noted that any number of user machines 106 of different users may be present in the environment 100. It is further noted that while example embodiments may discuss images in terms of photographs or pictures, example embodiments may be used to define user controls for any type of image data.

Figure 2:
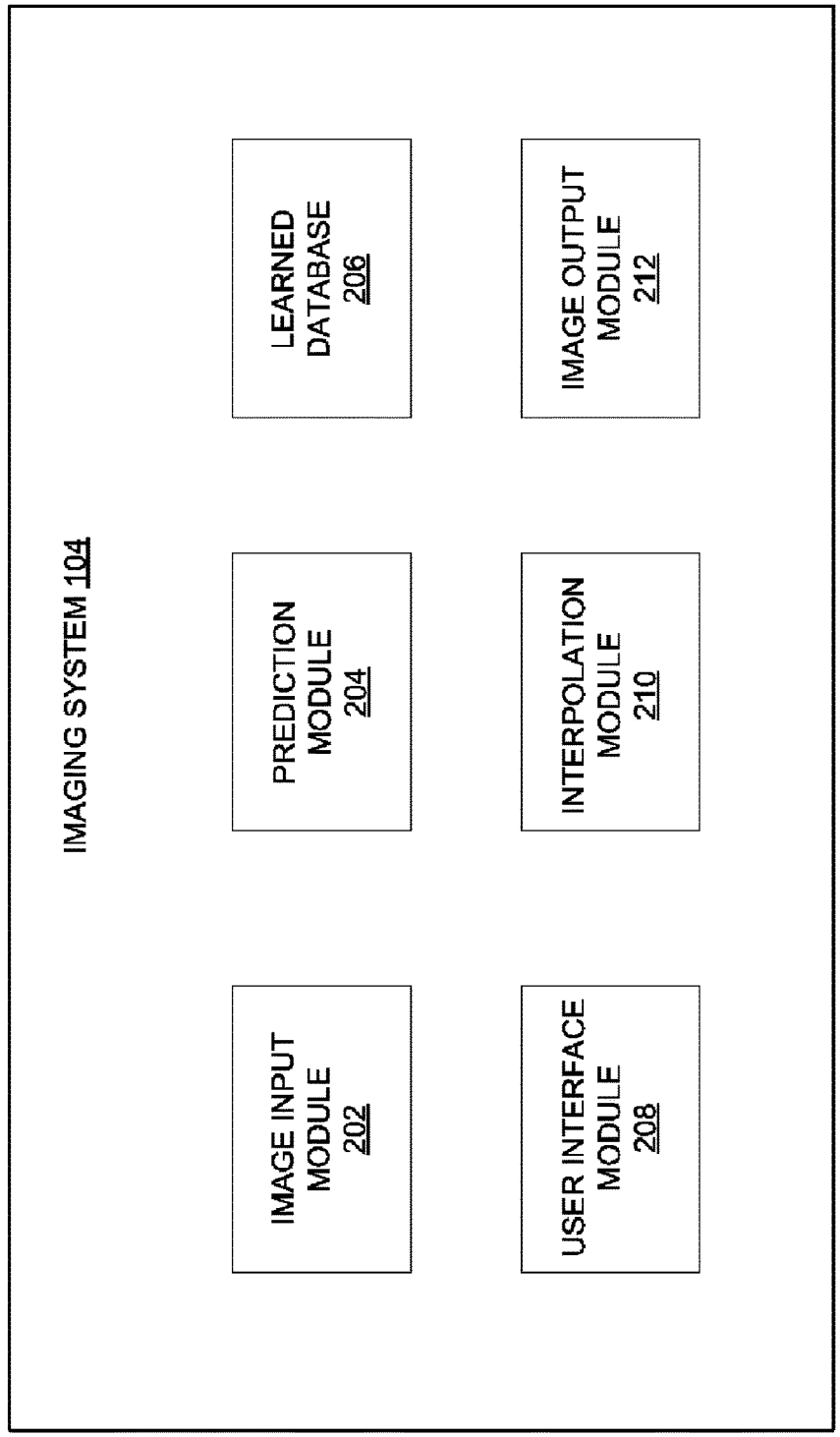
FIG. 2 is a block diagram illustrating an example embodiment of an imaging system.

Referring now to FIG. 2, the example imaging system 104 is shown in more detail. The imaging system 104 applies machine learning (e.g., trained algorithm and reference data) to new images to provide user controls for image adjustments. To enable this process, the imaging system 104 may comprise an image input module 202, a prediction module 204, a learned database 206, a user interface module 208, an interpolation module 210, and an image output module 212 coupled in communication.

The image input module 202 receives the new image that is to be adjusted. In some cases, the new image may be accessed from an image capture device (e.g., a camera). Alternatively, the new image may be accessed from a storage device (not shown) on, or coupled to, the user machine 106.

Upon the user activating the imaging system 104 to adjust the new image, the prediction module 204 analyzes the new image and proposes a plurality of adjustments for the new image in a form of adjusted versions of the new image referred to as basis styles. In example embodiments, the prediction module 204 determines new image descriptors for the new image. Using the new image descriptors, the prediction module 204 accesses the learned database 206 to compare the new image descriptors to image descriptors of the reference images in the reference dataset. Each reference image is assigned a weight that represents how similar the reference image is to the new image based on the comparison of the image descriptors. For example, the new image descriptors may indicate that the new image is of a sunset, and the reference images that are also sunsets are assigned a higher weight representing a stronger similarity. This weight may be applied to the adjustment parameters of each reference image.

In an alternative embodiment, the reference image having the closest set of image descriptors to those of the new image descriptors is determined to be a most similar image. For example, the new image descriptors may indicate that the new image is of a sunset and the reference image determined to be the most similar may also be a sunset. Once the most similar reference image is determined, the adjustment parameters (e.g., correction curve) applied to the reference image may be similarly applied to the new image to generate a plurality of basis styles and a good style.

In example embodiments, the prediction module 204 may determine how similar each reference image is by examining a reference dataset and ranking the reference images in the reference dataset based on a comparison of the image descriptors (e.g., how many or how close the image descriptors of the reference image match the new image descriptors). As such, the reference images may be ranked/weighted between a value of zero (e.g., not related at all to the new image) to one (e.g., completely related to the new image). In other embodiments, some image descriptors may be more important than other image descriptors and the ranking of the reference images may be adjusted or weighted accordingly.

In conventional systems, the image adjustments (e.g., brightness adjustment) are fixed. That is, the image adjustments for a particular image are predetermined for the new image regardless of its content. In contrast, the prediction module 204 analyzes the content of the image to determine the new image descriptors and uses the learned data from the reference dataset to determine what a particular image basis style or reference point may look like (e.g., a bright version of the new image should look like this and a dark version like this). Because the adjustment parameters are based on the content of the new images, the basis styles are different for each new image.

In some embodiments, the learned data is used to predict any number of image control adjustments by the prediction module 204. For example, the user may be allowed to adjust a combination of both the contrast and brightness using at least four basis styles (e.g., four "extreme" versions of the new image including one reference point for each combination of lowest and highest versions of the image control). In another example, the user may be allowed to adjust a combination of three image controls (e.g., contrast, brightness, and sharpness) using at least eight basis styles (e.g., one reference point for each combination of lowest and highest versions of the image control). For simplicity, example embodiments will be discussed herein using a combination of two image controls: brightness and contrast. However, it is contemplated that any number of one or more image controls of any image control type are applicable to example embodiments. An example process for using machine learning to define user controls for image adjustments will be discussed in more detail in connection with FIG. 4 below.

The user interface module 208 provides a user interface on which the basis styles may be presented to the user. In one embodiment, the basis styles may be presented graphically as different versions of the new image. For example, versions of the new image with various combinations of low and high brightness and contrast may be presented to the user. In some embodiments, an adjusted "good" version of the new image may also be presented in the user interface. In another example, the basis styles may be presented as a value on a slider or other control mechanism with which the user may make adjustments. The user may not like any of the basis styles, but would like a version in between two of the basis styles. The user may indicate this adjustment using the control mechanism.

The interpolation module 210 may receive the adjustment indicated using the control mechanism and adjust the new image accordingly. As discussed above, the prediction module 204 may generate at least four basis styles for the different combinations of adjustments made to contrast and brightness. In order to determine an adjusted style or reference point between the basis styles and/or the good style, the interpolation module 210 interpolates between these styles. For example, if the basis styles correspond to reference points that are 0 and 100 (e.g., in terms of brightness), then the interpolation module 210 may interpolate between the basis styles to determine an adjusted reference point of, for example, 40 (e.g., in terms of brightness).

It is contemplated that the basis styles do not need to be the "extremes" of the image control. For example, the basis styles may be at 20 and 80 for an image control. In these embodiments, the interpolation module 210 may extrapolate using two basis styles. For example, if the basis styles are 20 and 80 for an image control, the interpolation module 210 may extrapolate to obtain an adjusted reference point at 10.

It is also contemplated that any two or more basis styles may be generated by the prediction module 204. For example, the prediction module 204 may generate a lowest, highest, and middle adjustment parameter basis style for the new image. Using more basis styles may provide a more precise adjustment when interpolating or extrapolating to obtain an adjusted reference point or style.

The image output module 212 outputs a final image to the user. In some embodiments, the user may continually adjust the new image until they arrive at a final image to their liking. The user may then indicate (e.g., selecting an "OK" button) that the final image is approved. The image output module 212 may save this final image (e.g., to a local or coupled storage device) and provide a clean full screen version of the final image to a display device of the user machine 106 (e.g., remove the basis styles from the user interface).

Figure 3:
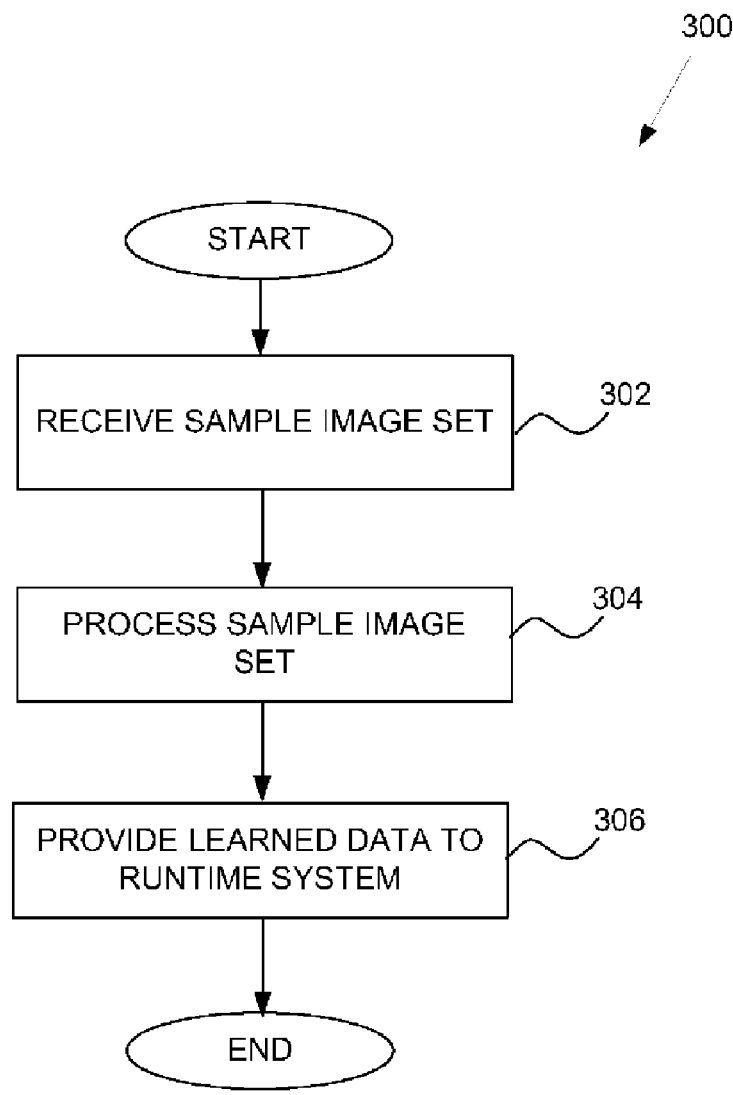
FIG. 3 is a flow diagram of an example high-level method for performing design time machine learning.

Referring now to FIG. 3, a flow diagram of an example high-level method 300 for performing design time machine learning is shown. The operations of the method 300 may be performed once by the design time system 102. In operation 302, a sample image set is received. For example, the sample image set may comprise 250 images that are adjusted by hand to provide adjusted versions of the sample images with "extreme" adjustment parameters applied thereto. For example, each image may be adjusted to provide versions having the lowest contrast, brightness, sharpness, and/or saturation as well as corresponding versions having highest contrast, brightness, sharpness, and/or saturation. In a two-dimensional embodiment, the sample images may be adjusted to "extremes" of a combination of image controls. For example, the sample images may be adjusted to a lowest brightness/lowest contrast version, a lowest brightness/highest contrast version, a highest brightness/lowest contrast version, and a highest brightness/highest contrast version for each image. It is contemplated that the image controls may be combined in any combination and corresponding versions of "extreme" sample images based on the combinations of the combined image controls used to train the algorithm in the design time system 102.

In operation 304, the sample image set is processed to "train" the algorithm. In example embodiments, the design time system 102 determines image descriptors for each sample image. The image descriptors (e.g., 150 values of image features or attributes) are used to distinguish one image from another. The design time system 102 also determines the adjustment parameters applied to each sample image in order to obtain the "extreme" versions. The image descriptors and corresponding adjustment parameters are stored as "learned data."

Once the design time system 102 completes training the algorithm, the trained algorithm and learned data is provided to the imaging system 104 in operation 306. In example embodiments, the trained algorithm and learned data may be transferred to the user machine 106 via a network (e.g., Internet, wide area network, or local area network) or using a tangible machine-readable storage medium (e.g., CD-ROM).

Figure 4:
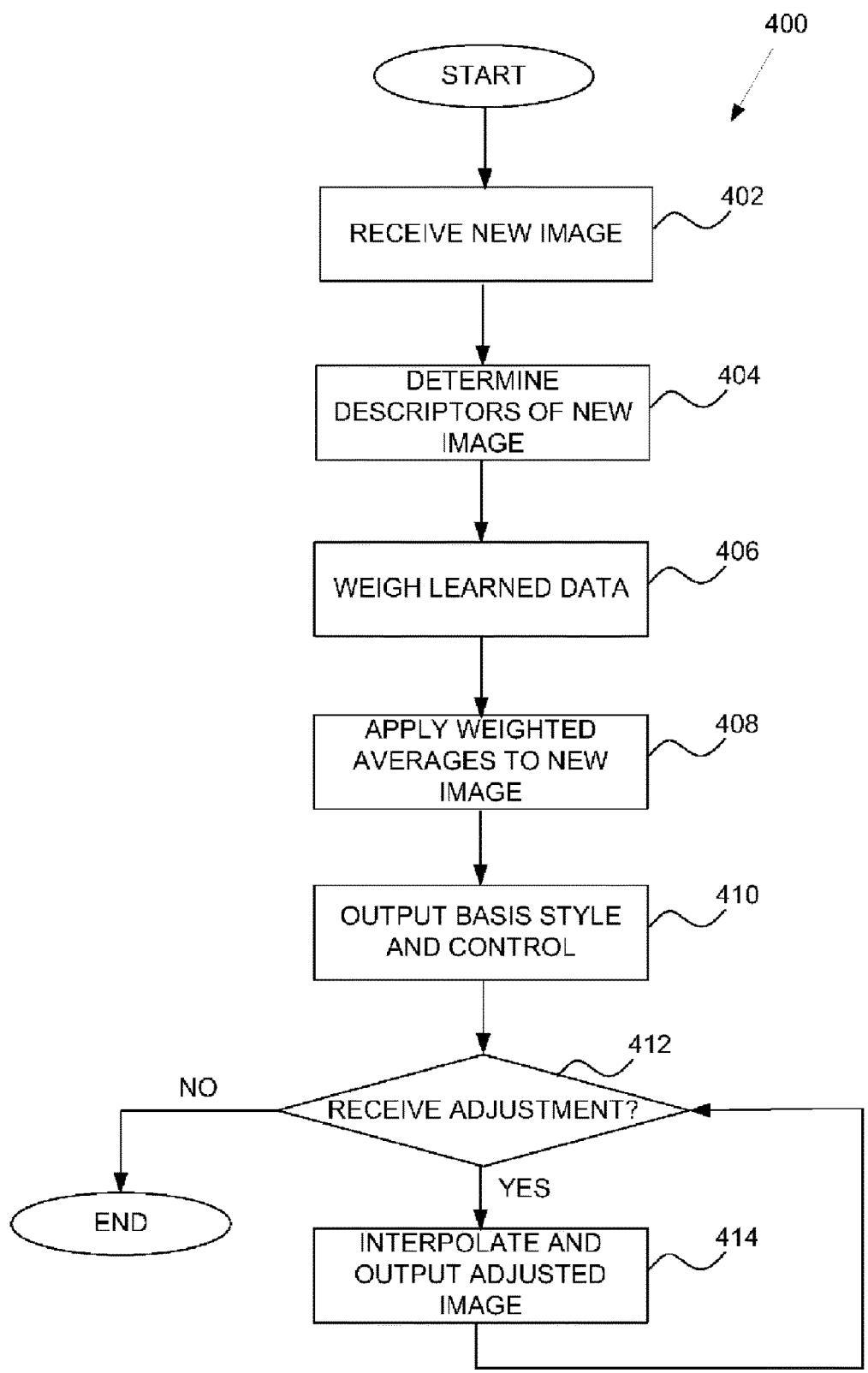
FIG. 4 is a flow diagram of an example high-level method for using machine learning to define user controls for image adjustments.

FIG. 4 is a flow diagram of an example high-level method 400 for using machine learning to define user controls for image adjustments. The operations of the method 400 are performed at the user machine 106 during run time. As such, a user may provide one or more images (referred to as "new images") to the imaging system 104 for adjustment. The images are "new" in the sense that the imaging system 104 has never "seen" the images before. In operation 402, the imaging system 104 receives a new image to be adjusted.

Accordingly, the image input module 202 may be coupled to a camera or a storage device and accesses/receives the new image.

In operation 404, the image descriptors are determined for the new image. In example embodiments, the prediction module 204 analyzes the new image to determine the new image descriptors (e.g., position of average pixel, ISO settings, number of faces, color tone, etc.) of the new image. In one example, there may be 150 image descriptors used by the prediction module 204 to "identify" the image or image type (e.g., a portrait, a sunset).

Using the new image descriptors, the prediction module 204 weighs the learned data in operation 406. In example embodiments, the prediction module 204 accesses the learned database 206 to compare the new image descriptors to image descriptors of the reference dataset. In one embodiment, each reference image in the reference dataset is assigned a weight representing how similar the reference image is to the new image. In alternative embodiments, other mechanisms may be used to compare the new image and the reference dataset to determine the reference image that is most similar to the new image (e.g., selecting a reference image having the closest set of image descriptors to those of the new image descriptors).

Once the weight of each reference image in the reference dataset is determined, weighted averages of one or more adjustment parameters applied to the reference images (based on the weight applied to each reference image) may be similarly applied to the new image in operation 408. For example, the weighted averages of the adjustment parameters corresponding to the extreme versions of the reference images may be applied to the new image to generate extreme versions of the new image (e.g., basis styles of the new image). Similarly, weighted adjustment parameters used to generate the good version of the reference image may be applied to the new image to generate a good version of the new image (e.g., a good style of the new image).

In operation 410, the basis styles along with a control mechanism to adjust the new image are output via a user interface. In one example, the new image may be positioned centered on the user interface and the basis styles positioned in corners of the user interface. This example does not generate or output a good style. Alternatively, the good style may be used to replace the new image in the user interface.

Figure 5:
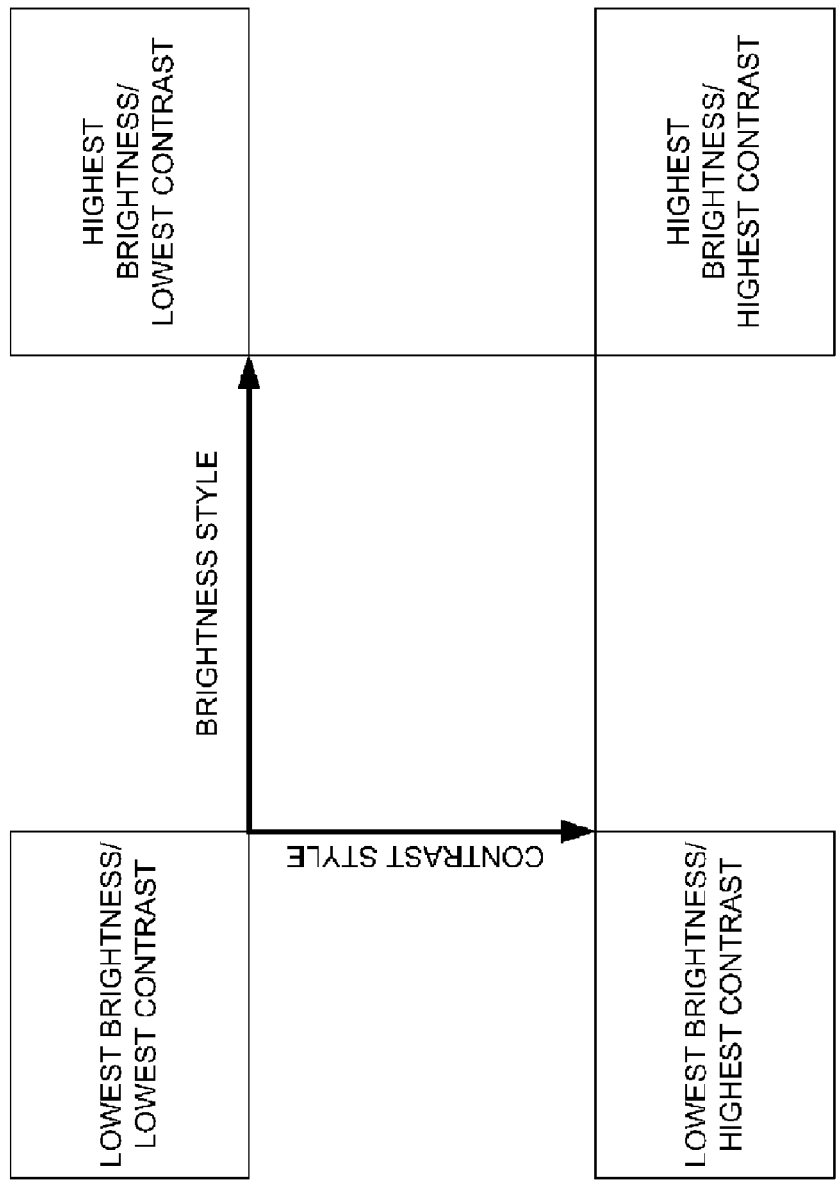
FIG. 5 is a diagram of an example basis style in a coordinate system.

FIG. 5 illustrates one example of the basis styles that may be provided based on a two-dimensionally trained adjustment algorithm. In this example, the algorithm is trained to adjust for a combination of brightness and contrast. The four basis styles are visualized in a coordinate system whereby each basis style is a version of the new image adjusted to "extremes" of the image control (e.g., lowest brightness/lowest contrast, highest brightness/lowest contrast, lowest brightness/highest contrast, and highest brightness/highest contrast). Since there are only two degrees of freedom in this embodiment, axes of the basis styles are orthogonal to each other. As such, the four basis styles may be visualized as four corners of a grid whose axes represent brightness and contrast values. It is contemplated that embodiments may be utilized that operate with a one-dimensionally trained adjustment algorithm resulting in at least two basis styles for one image control and one degree of freedom. Alternatively, a three-dimensionally trained adjustment algorithm may provide at least eight basis styles (e.g., for different combinations of three image controls) having three degrees of freedom.

Referring back to FIG. 4, a determination is made as to whether an adjustment is made by the user in operation 412. If no adjustment is made (e.g., the user selects an image corresponding to one of the basis styles), the method 400 ends. However, if the user makes an adjustment using, for example, the control mechanism, the interpolation module 210 may interpolate (or extrapolate) between the corresponding adjustment parameters to obtain a new adjustment parameter that corresponds with a position of the control mechanism on the user interface in operation 414. This new adjustment parameter is applied to the new image and output to the user interface. It is noted that in one embodiment, the interpolation and output of a newly adjusted image occurs substantially in real time with the movement of the control mechanism.

Figure 6:
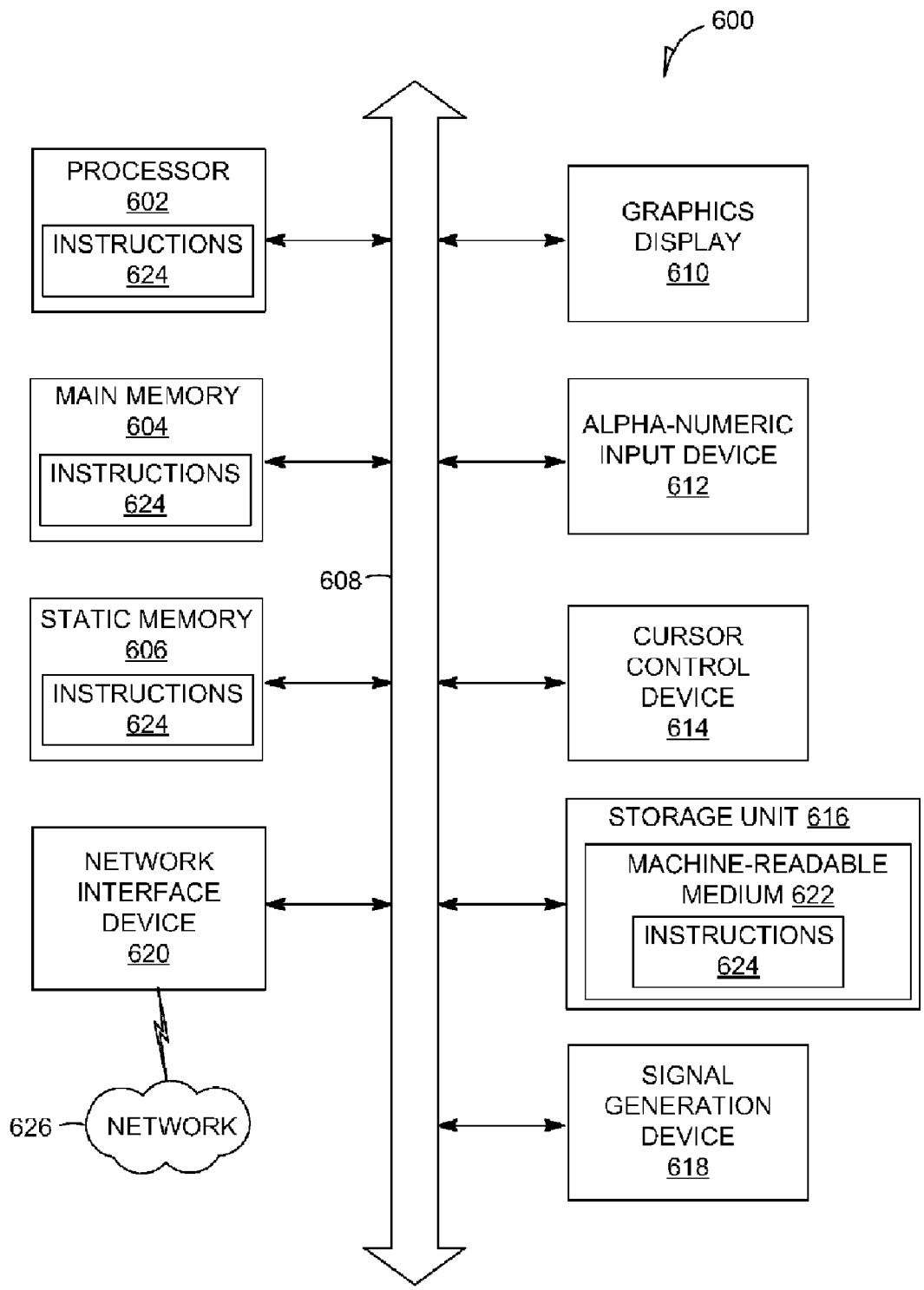
FIG. 6 is a simplified block diagram of a machine in an example form of a computing system within which a set of instructions for causing the machine to perform any one or more of the methodologies discussed herein may be executed.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system and within which instructions 624 (e.g., software, a program, an application, an applet, an app, or other executable code) for causing the machine 600 to perform any one or more of the methodologies discussed herein may be executed. In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624, sequentially or otherwise, that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The machine 600 may further include a graphics display 610 (e.g., a plasma display panel (PDP), a light emitting diode (LED) display, a liquid crystal display (LCD), a projector, or a cathode ray tube (CRT)). The machine 600 may also include an alphanumeric input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a speaker), and a network interface device 620.

The storage unit 616 includes a tangible machine-readable medium 622 on which is stored the instructions 624 embodying any one or more of the methodologies or functions described herein. The instructions 624 may also reside, completely or at least partially, within the main memory 604, within the processor 602 (e.g., within the processor's cache memory), or both, during execution thereof by the machine 600. Accordingly, the main memory 604 and the processor 602 may be considered as machine-readable media. The instructions 624 may be transmitted or received over a network 626 via the network interface device 620.

As used herein, the term "memory" refers to a tangible machine-readable medium able to store data temporarily or permanently and may be taken to include, but not be limited to, random-access memory (RAM), read-only memory (ROM), buffer memory, flash memory, and cache memory. While the tangible machine-readable medium 622 is shown in an example embodiment to be a single medium, the term "tangible machine-readable medium" should be taken to include a single medium or multiple media (e.g., a centralized or distributed database, or associated caches and servers) able to store instructions (e.g., instructions 624). The term "tangible machine-readable medium" shall also be taken to include any medium, or combination of multiple media, that is capable of storing instructions for execution by a machine (e.g., machine 600), such that the instructions, when executed by one or more processors of the machine (e.g., processor 602), cause the machine to perform any one or more of the methodologies described herein. Accordingly, a "tangible machine-readable medium" may refer to a single storage apparatus or device, as well as "cloud-based" storage systems or storage networks that include multiple storage apparatus or devices. The term "tangible machine-readable medium" shall accordingly be taken to include, but not be limited to, one or more data repositories in the form of a solid-state memory, an optical medium, a magnetic medium, or any suitable combination thereof. Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 624 may further be transmitted or received over a communications network 626 using a transmission medium via the network interface device 620 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a stand-alone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept, if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

Having thus described the invention, what is claimed is:

1. A method comprising:
   receiving a user-provided image to be adjusted;
   determining at least one image descriptor of the user-provided image to be adjusted;
   generating, using a hardware processor, a plurality of basis styles comprising adjusted versions of the user-provided image, wherein the plurality of basis styles are generated based on a sample image set having similar image descriptors as the at least one image descriptor of the user-provided image; and
   providing the plurality of basis styles on a user interface of a display device.

2. The method of claim 1, further comprising:
   ranking each sample image in the sample image set based on similarity of image descriptors of each sample image relative to the at least one image descriptor of the user-provided image to be adjusted.

3. The method of claim 1, wherein the sample image set includes sample images having at least one image descriptor that matches the at least one image descriptor of the user-provided image.

4. The method of claim 1, wherein the plurality of basis styles comprising adjusted versions of the user-provided image are further generated based on an adjustment to an image control, the adjustment applied to one or more sample images of the sample image set having similar image descriptors as the at least one image descriptor of the user-provided image.

5. The method of claim 4, wherein the image control comprises at least one of a brightness control, a contrast control, a sharpness control, and a saturation control.

6. The method of claim 1, wherein the sample image set includes a sample image having image descriptors determined to be most similar to the at least one image descriptor of the user-provided image.

7. The method of claim 1, further comprising:
   interpolating between two or more of the plurality of basis styles to obtain an adjusted reference point in between said two or more of the plurality of basis styles.

8. The method of claim 1, further comprising:
   receiving an adjustment input via the user interface, wherein the adjustment input indicates an adjustment relative to two or more of the plurality of basis styles and to be applied to the user-provided image.

9. The method of claim 8, further comprising:
   based on the adjustment input, applying the adjustment input to the user-provided image, wherein the adjustment input adjusts one or more image controls relative to the plurality of basis styles.

10. The method of claim 1, further comprising:
    providing a control mechanism on the user interface, the control mechanism facilitating adjustment input by a user, the adjustment input including an adjustment to one or more image controls relative to the plurality of basis styles.

11. A tangible machine-readable medium in communication with at least one processor, the tangible machine-readable medium storing instructions which, when executed by the at least one processor of a machine, cause the machine to perform operations comprising:

receiving a user-provided image to be adjusted;

determining at least one image descriptor of the user-provided image, wherein the at least one image descriptor is relevant to content of the user-provided image;

using a hardware processor, generating a plurality of basis styles, each of the plurality of basis styles comprising a version of the user-provided image having an adjustment to at least one image control of a corresponding basis style, wherein the plurality of basis styles are generated based on a sample image set having similar image descriptors as the at least one image descriptor of the user-provided image; and providing the plurality of basis styles on a user interface of a display device.

12. The tangible machine-readable medium of claim 11, wherein the operations further comprise:

for each sample image in the sample image set:

determining an image descriptor that is relevant to content of the sample image;

generating a first version of the sample image adjusted using a lowest value of a first image control;

generating a second version of the sample image adjusted using a highest value of the first image control; and generating a control version of the sample image adjusted using a control value that is between the highest value and the lowest value of the first image control.

13. The tangible machine-readable medium of claim 12, wherein generating the plurality of basis styles includes:

referencing the control version of the sample image in the sample image set.

14. The tangible machine-readable medium of claim 12, wherein the operations further comprise:

predicting a value for the first image control based on one or more of the first version, the second version, and the control version of the sample image; and referencing the value predicted when generating the plurality of basis styles.

15. The tangible machine-readable medium of claim 11, wherein the operations further comprise:

comparing image descriptors of sample images in the sample image set to the at least one image descriptor of the user-provided image; and based on the comparison, ranking each sample image in the sample image set to indicate similarity of the image descriptors of the sample images relative to the at least one image descriptor of the user-provided image.

16. The tangible machine-readable medium of claim 11, wherein generating the plurality of basis styles includes:

receiving an input via the user interface of the display device, wherein the input indicates an adjustment relative to two or more of the plurality of basis styles to be applied to the user-provided image.

17. The tangible machine-readable medium of claim 11, wherein the operations further comprise:

matching the at least one image descriptor of the user-provided image to at least one image descriptor of one or more sample images in the sample image set.

18. The tangible machine-readable medium of claim 11, wherein the operations further comprise:

receiving an adjustment input via the user interface, the adjustment input indicating an adjustment relative to at least two of the plurality of basis styles.

19. A system comprising:

a hardware processor of a machine;

an image input module to receive an image to be adjusted;

a prediction module to determine content of the image to be adjusted and determine content of sample images of a sample image set;

generate, using the hardware processor, a plurality of basis styles, each of the plurality of basis styles comprising a version of the image having an adjustment to at least one image control of a corresponding basis style, wherein the plurality of basis styles are generated using one or more adjustments applied to sample images of the sample image set having content determined to be similar to content of the image; and a user interface module to provide the plurality of basis styles on a user interface of a display device.

20. The system of claim 19, further comprising an interpolation module to interpolate between at least two of the plurality of basis styles to obtain an adjusted reference point in between the at least two basis styles.

* * * * *